(12) United States Patent
Holzmueller et al.

(10) Patent No.: US 10,763,011 B2
(45) Date of Patent: Sep. 1, 2020

(54) POWER CABLE HAVING MULTIPLE LAYERS INCLUDING FOAMED PROTECTIVE LAYER

(71) Applicant: SCHLUMBERGER TECHNOLOGY CORPORATION, Sugar Land, TX (US)

(72) Inventors: Jason Holzmueller, Lawrence, KS (US); Mark Metzger, Lawrence, KS (US); John Mullholland, Lawrence, KS (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 266 days.

(21) Appl. No.: 15/532,735

(22) PCT Filed: Nov. 20, 2015

(86) PCT No.: PCT/US2015/061741
§ 371 (c)(1),
(2) Date: Jun. 2, 2017

(87) PCT Pub. No.: WO2016/089619
PCT Pub. Date: Jun. 9, 2016

(65) Prior Publication Data
US 2017/0365376 A1 Dec. 21, 2017

Related U.S. Application Data

(60) Provisional application No. 62/086,369, filed on Dec. 2, 2014.

(51) Int. Cl.
*H01B 7/18* (2006.01)
*H01B 13/06* (2006.01)
(Continued)

(52) U.S. Cl.
CPC ........... *H01B 7/189* (2013.01); *E21B 43/128* (2013.01); *H01B 1/026* (2013.01); *H01B 3/20* (2013.01);
(Continued)

(58) Field of Classification Search
CPC ........ H01B 7/046; H01B 3/427; H01B 7/282; H01B 1/026; H01B 3/20; H01B 3/28;
(Continued)

(56) References Cited

U.S. PATENT DOCUMENTS 4,130,450 A 12/1978 Bander et al.
4,284,841 A 8/1981 Tijunelis et al.
(Continued)

OTHER PUBLICATIONS

International Search Report and Written Opinion for corresponding PCT Application No. PCT/US2015/061741, dated Mar. 4, 2016, 10 pages.
(Continued)

*Primary Examiner* — Timothy J Thompson
*Assistant Examiner* — Amol H Patel

(57) ABSTRACT

A technique facilitates construction and operation of a power cable which may be used to supply power to an electric submersible pumping system downhole into a wellbore. The power cable comprises at least one electrical conductor. Each electrical conductor is insulated with an insulation layer and protected from deleterious fluids by a fluid barrier layer. Further protection is provided by a protective layer disposed around the fluid barrier layer. The protective layer is foamed to provide a cushion layer and to further protect components of the power cable. An armor layer may be disposed around the protective layer.

20 Claims, 2 Drawing Sheets

(51) Int. Cl.
- *H01B 7/282* (2006.01)
- *H01B 3/28* (2006.01)
- *H01B 1/02* (2006.01)
- *H01B 13/24* (2006.01)
- *E21B 43/12* (2006.01)
- *H01B 3/20* (2006.01)
- *H01B 3/44* (2006.01)
- *H01B 7/04* (2006.01)

(52) U.S. Cl.
CPC ............... *H01B 3/28* (2013.01); *H01B 3/441* (2013.01); *H01B 7/046* (2013.01); *H01B 7/282* (2013.01); *H01B 13/06* (2013.01); *H01B 13/24* (2013.01); *Y02A 30/14* (2018.01)

(58) Field of Classification Search
CPC ...... H01B 13/06; H01B 7/2825; H01B 7/285; H01B 7/2855
See application file for complete search history.

(56) References Cited

U.S. PATENT DOCUMENTS

| | | | |
|---|---|---|---|
| 4,449,013 A | 5/1984 | Garshick | |
| 4,472,597 A | 9/1984 | Uematsu | |
| 4,600,805 A | 7/1986 | Glynn et al. | |
| 4,703,134 A | 10/1987 | Uematsu | |
| 5,483,020 A * | 1/1996 | Hardie | H01B 11/203 156/51 |
| 6,127,632 A * | 10/2000 | Oswald | H01B 7/046 174/120 R |
| 10,262,768 B2 | 4/2019 | Holzmueller et al. | |
| 2002/0104675 A1 | 8/2002 | McLeod | |
| 2010/0186990 A1* | 7/2010 | Neuroth | H01B 7/045 174/120 AR |
| 2011/0011617 A1 | 1/2011 | Walid | |
| 2011/0240312 A1 | 10/2011 | Varkey et al. | |
| 2013/0153260 A1* | 6/2013 | Favereau | H01B 7/18 174/102 C |
| 2013/0183177 A1* | 7/2013 | Manke | E21B 17/206 417/422 |
| 2013/0306348 A1* | 11/2013 | Holzmueller | H01B 9/02 174/105 R |
| 2014/0027152 A1 | 1/2014 | Holzmueller et al. | |
| 2014/0158379 A1 | 6/2014 | Cox | |

OTHER PUBLICATIONS

International Search Report and Written Opinion for related PCT Application Serial No. PCT/US2015/062883, dated Mar. 8, 2016, 13 pages.

* cited by examiner

POWER CABLE HAVING MULTIPLE LAYERS INCLUDING FOAMED PROTECTIVE LAYER

CROSS-REFERENCE TO RELATED APPLICATION

The present document is based on and claims priority to U.S. Provisional Application Ser. No. 62/086,369 filed Dec. 2, 2014, which is incorporated herein by reference in its entirety.

BACKGROUND

In many hydrocarbon well applications, electric submersible pumping systems are used for pumping of fluids, e.g. hydrocarbon-based fluids. The hydrocarbon fluids are pumped from a subterranean geologic formation, referred to as a reservoir, by operating the electric submersible pumping system within a wellbore. In general, the electric submersible pumping system comprises a submersible pump powered by an electric, submersible motor which receives power via a power cable routed downhole into the wellbore. The power cable comprises three electrical conductors which supply three-phase power to the submersible motor which, in turn, powers a submersible pump. The electrical conductors are each round in cross-section and collectively enclosed within armor. However, the structure of the electrical conductors and cooperating layers of the overall power cable may be space inefficient and susceptible to damage.

SUMMARY

In general, a system and methodology enable construction of a power cable which is internally protected by a foamed protective layer. The power cable comprises at least one electrical conductor. Each electrical conductor is insulated with an insulation layer and protected from deleterious fluids by a fluid barrier layer. Further protection is provided by a protective layer disposed around the fluid barrier layer. The protective layer is foamed to provide a cushion layer and to further protect components of the power cable. An armor layer may be disposed around the protective layer.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
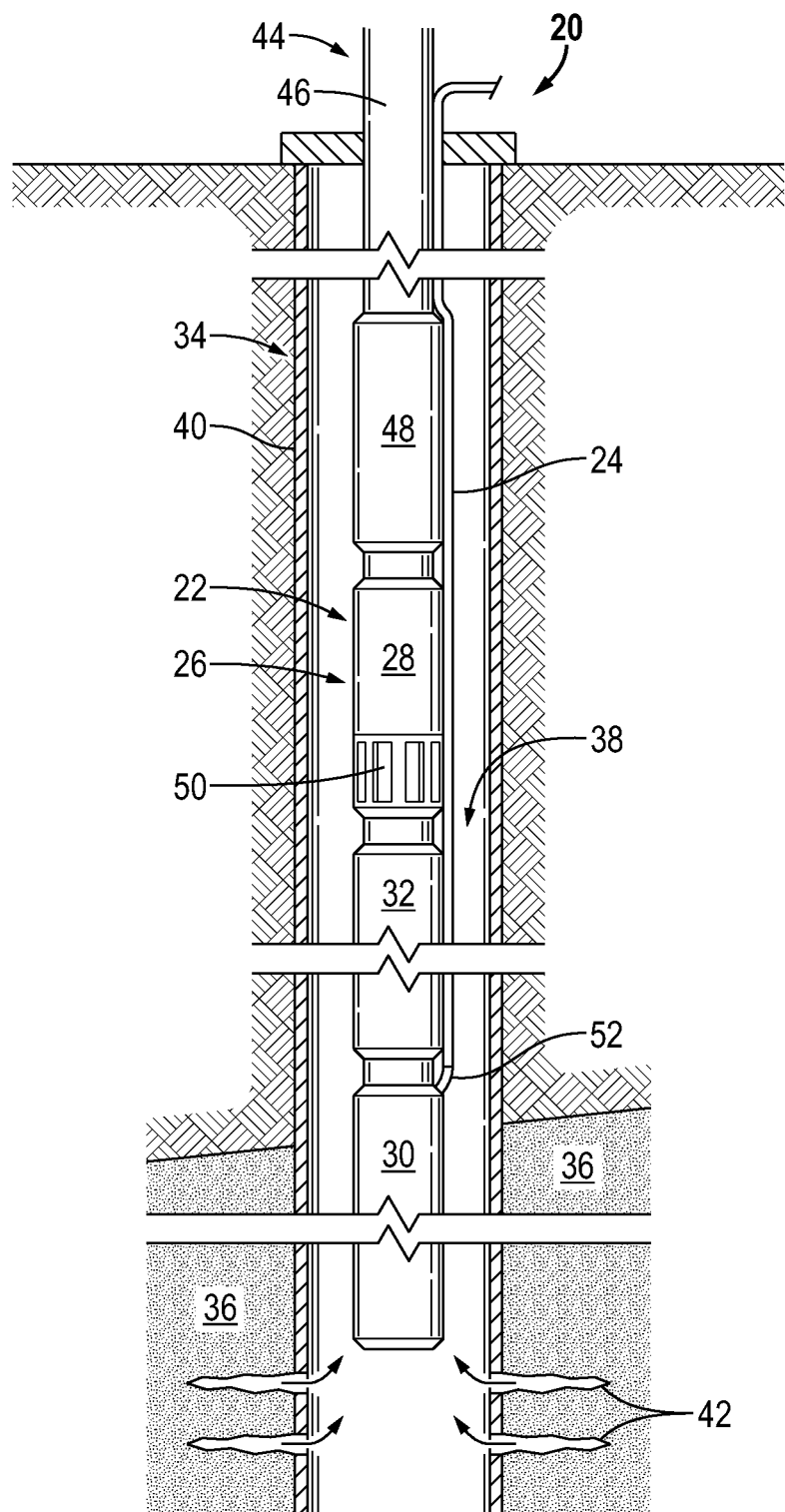
FIG. 1 is a schematic illustration of a well system comprising an electric submersible pumping system positioned in a wellbore and powered via electrical power provided by a power cable routed downhole along the wellbore, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a power cable and construction of a power cable which is protected internally by a foamed protective layer. The power cable comprises at least one electrical conductor, e.g three electrical conductors to provide three-phase power. Each electrical conductor is insulated with an insulation layer and protected from deleterious fluids by a fluid barrier layer. The insulation layer may comprise a single layer of insulation material or combined layers to provide the desired electrical insulation. Similarly, the fluid barrier layer may comprise a single layer or combined layers to protect the insulation and electrical conductor from unwanted fluids. Further protection is provided by a protective layer disposed around the fluid barrier layer. The protective layer is foamed to provide a cushion layer and to further protect components of the power cable. An armor layer may be disposed around the protective layer. The armor layer may be disposed in direct contact with the protective layer (without an additional jacket layer) to provide a protected power cable in a relatively smaller, space efficient form.

As described in greater detail below, embodiments of the cable utilize the foamed, protective layer to provide cushioning within a power cable, such as a power cable for electric submersible pumping system. The methodology facilitates construction of the cushioning, protective layer by, for example, extruding a foamed material over the fluid barrier layer. The fluid barrier layer can be formed with fluoropolymer tapes and/or extruded lead sheaths to provide chemical resistance. However, such materials may provide poor mechanical properties in a variety of applications and environments.

By disposing the foamed, protective layer over the fluid barrier material, cushioning is provided within the power cable to protect the fluid barrier materials from damage during construction, handling, and use of the power cable. The reduction or elimination of damage and/or mechanical stress on the fluid barrier layers promotes an increased life for the power cable in the downhole environment. The increased cable life, in turn, provides increased reliability and runtime for the electric submersible pumping system. Use of the foamed protective layer also enables elimination of conventional jacket layers to provide a more space efficient power cable.

Depending on the application, power cables may be rated in the range of 3-8 kV or other suitable ratings. The power cable may be structured in a generally flat or round cable construction. For example, round power cables may be used when there is sufficient room in the wellbore to accommodate the wider profile of a round cable. Flat cable constructions are useful in many well applications because they occupy less space between the well string and the surrounding wellbore wall thus mitigating clearance issues within the wellbore.

In a specific example, a power cable with a round or flat cross-sectional construction may be rated up to about 5 kV. Depending on the application, the power cable may comprise various conductors, e.g. copper conductors, surrounded by various layers. By way of example, the layers surrounding the conductors may comprise insulation layers, e.g. ethylene propylene diene monomer (EPDM) rubber insulation, to provide oil and heat resistance. The layers also may comprise at least one fluid barrier layer, e.g. a lead sheath and/or fluoropolymer tape wrap barrier layer, a foamed protective layer, and an armor layer, e.g. a galvanized steel, stainless steel, or Monel™ armor layer. In some applications, the various layers may be formed from other types of materials or combinations of materials.

It should be noted that conventional cable construction often employed an additional jacket layer and/or other types of additional layers. In embodiments described herein, however, power cables, e.g. flat power cables, may be constructed without a jacket layer to help reduce cost and to improve clearance when employed in a wellbore. The fluid barrier may be protected from direct contact with the armor layer (such contact can result in gouges or cuts to the fluid barrier layer during handling and use of the power cable) by the foamed protective layer.

Damage to the fluid barrier layer can substantially reduce the operational life of the power cable and thus of the electric submersible pumping system, especially when the power cable is used in corrosive, gassy, and/or hot wellbore environments. As described in greater detail below, the protective layer provides cushioning and protection which reduces or eliminates the potential for damage to the fluid barrier layer. This ensures a longer life of the power cable and electric submersible pumping system. The protective layer may be foamed and placed between the fluid barrier layer and the armor layer to provide the cushioning and protection.

Referring generally to FIG. 1, an embodiment of a well system is illustrated as comprising a downhole, electrically powered system, e.g an electric submersible pumping system. Electric power is provided to the electric submersible pumping system or other powered system via a power cable. The power cable, in turn, is coupled with the electrically powered system by an electrical connector, e.g. a pothead assembly. The illustrated electric submersible pumping system or other types of electrically powered systems may comprise many types of components and may be employed in many types of applications and environments, including cased wells and open-hole wells. The well system also may be utilized in vertical wells or deviated wells, e.g. horizontal wells.

Referring again to FIG. 1, a well system 20 is illustrated as comprising an electrically powered system 22 which receives electric power via an electrical power cable 24. By way of example, the electrically powered system 22 may be in the form of an electric submersible pumping system 26, and the power cable 24 may be designed to withstand high temperature, harsh environments. Although the electric submersible pumping system 26 may have a wide variety of components, examples of such components comprise a submersible pump 28, a submersible motor 30, and a motor protector 32. The power cable 24 may be structurally and electrically coupled with the electric submersible motor 30.

In the example illustrated, electric submersible pumping system 26 is designed for deployment in a well 34 located within a geologic formation 36 containing, for example, petroleum or other desirable production fluids. A wellbore 38 may be drilled and lined with a wellbore casing 40, although the electric submersible pumping system 26 (or other type of electrically powered system 22) may be used in open hole wellbores or in other environments exposed to hydrocarbons, high temperatures, and high-pressure deleterious gases.

In the example illustrated, however, casing 40 may be perforated with a plurality of perforations 42 through which production fluids flow from formation 36 into wellbore 38. The electric submersible pumping system 26 may be deployed into the wellbore 38 via a conveyance or other deployment system 44 which may comprise tubing 46, e.g. coiled tubing or production tubing. By way of example, the conveyance 44 may be coupled with the electrically powered system 22 via an appropriate tubing connector 48. In the illustrated embodiment, power cable 24 is routed along deployment system 44. However, the electric submersible pumping system 26 also can be suspended via the power cable 24 to form a cable deployed electric submersible pumping system 26. In this latter application, the power cable 24 is constructed as a robust cable able to support the weight of the electric submersible pumping system 26.

In the embodiment illustrated, electric power is provided to submersible motor 30 by electrical power cable 24. The submersible motor 30, in turn, powers submersible pump 28 which draws in fluid, e.g. production fluid, into the pumping system through a pump intake 50. The fluid is produced or moved to the surface or other suitable location via tubing 46. However, the fluid may be pumped to other locations along other flow paths. In some applications, for example, the fluid may be pumped along an annulus surrounding conveyance 44. In other applications, the electric submersible pumping system 26 may be used to inject fluid into the subterranean formation or to move fluids to other subterranean locations.

As described in greater detail below, the electrical power cable 24 is constructed to reduce or eliminate the potential for internal damage to the cable while maintaining a space efficient construction. This allows the power cable 24 to consistently deliver electric power to the submersible pumping system 26 over long operational periods in environments subject to high temperatures, high pressures, deleterious fluids, high voltages, and/or other conditions which can be detrimental to conventional power cables. The power cable 24 is connected to the corresponding, electrically powered component, e.g. submersible motor 30, by an electrical connector 52, e.g. a suitable pothead assembly.

Depending on the application, the power cable 24 may comprise an individual electrical conductor protected by various internal layers or a plurality of electrical conductors protected by the corresponding internal layers. In various submersible pumping applications, the electrical power cable 24 may be in the form of a motor lead extension. In many of these applications, the motor lead extension 24 is designed to carry three-phase current, and submersible motor 30 comprises a three-phase motor powered by the three-phase current delivered through the three electrical conductors of the power cable 24.

Figure 2:
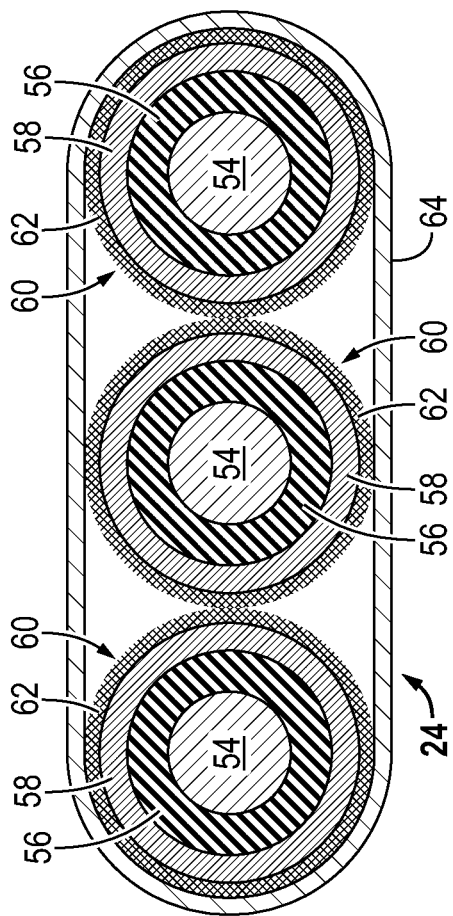
FIG. 2 is a cross-sectional view of an example of a power cable having a foamed protective layer, according to an embodiment of the disclosure.

Referring generally to FIG. 2, an embodiment of power cable 24 is illustrated. In this example, the power cable 24 comprises at least one conductor 54, e.g. three conductors 54 for three phase power. Each conductor 54 may be coated or otherwise covered with an insulation layer 56. Additionally, each insulation layer 56 may be coated or otherwise covered with a fluid barrier layer 58.

In a specific embodiment, the cable 24 comprises three conductors 54 which are each coated/covered with the layers 56, 58 and then combined, e.g., laid adjacent to one another to form a generally flat power cable 24. In this example, each fluid barrier layer 58 is surrounded by a protective layer 60 which protects and cushions the fluid barrier layer 58 against damage that could otherwise occur during assembly, transport, and/or use of the power cable 24. The protective layer 60 may be a foamed protective layer formed from a foamed material 62. The protective layer 60 may be formed around each fluid barrier layer 58 individually or the protective layer 60 may be formed around the plurality of fluid barrier layers 58 collectively.

In at least some embodiments, a next layer surrounding the protective layers 60 is an armor layer 64. The armor layer 64 may be formed of a suitably strong material, e.g. a steel strip armor wrap, for ease of handling and to protect internal conductors 54 and cable layers 56, 58, 60. The armor layer 64, combined with the cable layers 56, 58, 60, provides resistance to incursion of well fluids and also an outer protective shell. In some applications, the armor layer 64 is in direct contact with protective layers 60. The protective layer 60 may be formed to protect the fluid barrier layers 58 without an additional jacket layer inside armor layer 64.

According to an embodiment, each conductor 50 may be formed from a suitable, electrically conductive material, such as copper. As an example, cable conductors 50 may be formed from high purity copper and may be solid, stranded or compacted stranded. Stranded and compacted stranded conductors offer improved flexibility, which may be useful in some embodiments. Each conductor 50 also may be coated with a corrosion resistant coating to prevent conductor degradation from, for example, hydrogen sulfide gas which is commonly present in downhole environments. Examples of such a coating include tin, lead, nickel, silver, or other corrosion resistant materials including other alloys or metals.

Insulation layers 56 may be formed from a variety of materials. By way of example, insulation layers 56 may be formed from a polymeric material, e.g. polyetheretherketone (PEEK), EPDM, or another suitable electrical insulation material. In some applications, a low-swell EPDM or oil-resistant EPDM material may be used to form insulation layers 56. Similarly, fluid barrier layers 58 may be formed from a variety of suitable materials depending on the parameters of a given application. By way of example, fluid barrier layers 58 may be formed of lead, e.g lead layers extruded over the corresponding insulation layers 56. However, fluid barrier layers 58 also may be formed from other suitable barrier materials, such as extruded or taped layers of fluoropolymers. For example, each fluid barrier layer 54 may be formed from a polytetrafluoroethylene (PTFE) film wrapped about the corresponding insulation layer 56.

In some embodiments, the protective layer 60 is formed as a foamed protective layer utilizing foamed material 62. The foamed protective layer 60 may be extruded over the fluid barrier layer 58 so as to form a continuous and contiguous covering atop the barrier layer 58. Depending on the application, the foamed protective layer 60 may be formed from a polymer with very high stiffness and cut resistance. In some embodiments, the foamed protective layer may be formed from polyester, e.g., polyethylene terephthalate (PET). The polymer may be a cross-linked material, such as cross-linked polyethylene (XLPE), or a fluid resistant material, such as the fluoropolymers: fluorinated ethylene propylene (FEP) or perfluoroalkoxy polymer (PFA).

In some embodiments, the polymer used to form protective layer 60 also may provide improved thermal stability properties and/or improved fluid resistance with respect to the power cable 24. Foaming of the polymer provides a protective, cushioning layer within the power cable 24. The polymer of protective layer 60 may be foamed by using a suitable blowing agent. In some blowing agent embodiments, the amount of blowing agent may be between about 0% and about 20% or more (e.g., 1.5%, 2%, 3%, 5%, 8%, 11%, . . . , 19%, 20%). Depending on the embodiment, the blowing agent may produce $CO_2$, $N_2$, or other gases which form pockets (voids or closed cell spaces) in the polymer to create foamed material 62. In some embodiments, however, the polymer may be foamed through a gas injection process.

Figure 3:
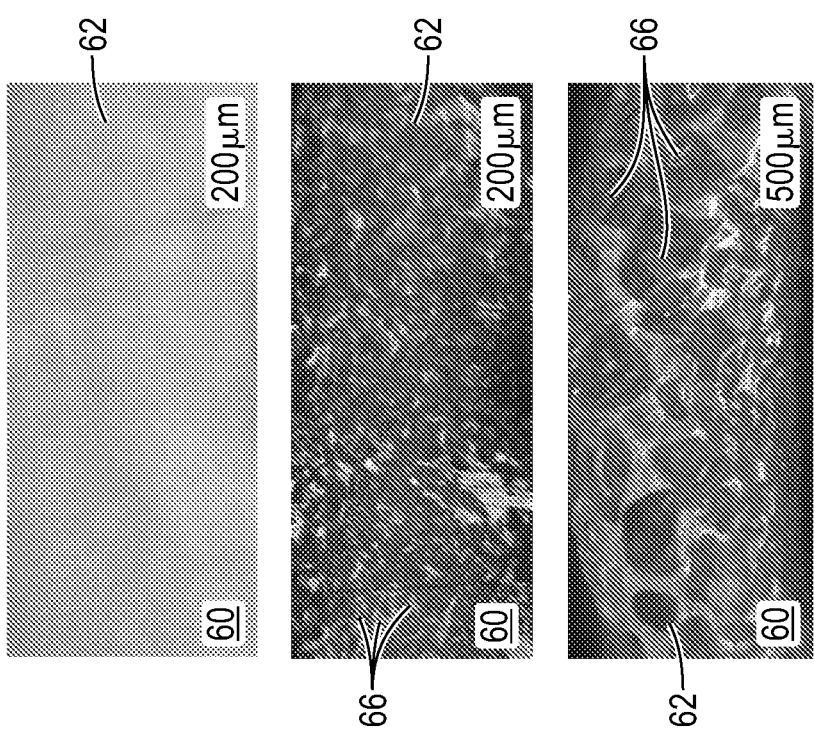
FIG. 3 is an enlarged cross-sectional view of an example of the protective layer with different percentages of blowing agent to create the foamed, protective layer, according to an embodiment of the disclosure.

Referring generally to FIG. 3, an example of the foamed material 62 used in creating foamed protective layer 60 is illustrated. FIG. 3 illustrates an upper image, middle image, and lower image showing material 62 with different percentages of blowing agent to create a desired protective layer 60. In this embodiment, a comparison is provided of a PET polymer with three different levels of blowing agent. In the example provided in FIG. 3, the PET polymer used to create material 62 of protective layer 60 is illustrated without blowing agent (top image; 200 µm resolution); with the PET polymer having 2% blowing agent (middle image; 200 µm resolution); and with the PET polymer having 5% blowing agent (bottom image; 500 µm resolution). The percentage of blowing agent may be adjusted and selected according to the parameters of a given application and/or environment in which the power cable 24 is utilized.

Use of the extruded foamed protective layer 60 provides improved crush resistance during the armoring process. By way of example, foamed material 62 may contain a plurality of closed internal air pockets 66 (see FIG. 3). The closed, internal air pockets 66 resist or absorb force(s) exerted on protective layer 60 during construction, handling, and/or use. For example, the internal air pockets 66 are able to absorb forces during the armoring process of applying armor layer 64, thus reducing or preventing indentation of the fluid barrier layer, e.g. lead barrier layer.

Use of foamed protective layer 60 also improves the radial strength of power cable 24 compared to a cable with a non-foamed protective layer. For example, a flat power cable 24 with a foamed protective layer 60 suffers substantially less deformation of a lead fluid barrier 58 after the armoring process. Without foamed protective layer 60, deformation of the elements, e.g. layers, between the conductors 54 may worsen when the cable 24 is deployed downhole and subjected to substantial heat which can cause expansion of the insulation layer 56. Over time, expansion of the insulation layer without protective layer 60 can lead to creep and failure of the fluid barrier layers 58, e.g. lead barrier layers, between the conductors 54. Failure of the fluid barrier layers 58 results in cable failure and substantial downtime with respect to the electric submersible pumping system 26.

Construction of power cable 24 with foamed protective layer 60 also facilitates a "flatter", more consistently shaped cable 24. By way of example, the foamed protective layer 60 may prevent the armoring process from digging into the outer conductors 54. This allows the opposing external sides of the armored cable 24 to be flatter (i.e. less rounded in cross-section) which facilitates both improved winding of the cable on a reel and improved clearance during installation. As illustrated in FIG. 2, the flat cable 24 with the foamed protective layer 60 has a very flat shape.

Other characteristic improvements also may result from use of the foamed protective layer 60. Examples include improved high temperature performance. The foamed protective layer 60 allows room for thermal expansion so as to prevent the lead or other material of fluid barrier layer 58 from deforming at high temperatures. Additionally, use of the foamed protective layer 60 tends to improve manufacturing speed. For comparison, a braided layer can be applied at about 18-20 feet per minute while a high speed tape wrapping machine may process a cable at about 100-200 feet per minute. An extruded foamed protective layer, however, may be applied at a much higher rate of, for example 200-800 feet per minute or even 500-1,300 feet per minute or higher.

Reduced material costs and reduced overall cost of the power cable 24 also may result from use of the foamed protective layer 60. Because the protective layer 60 is a foamed extrusion, a substantial portion of the protective layer's volume is formed with gas pockets (e.g., air pockets). The gas pockets reduce the quantity of polymeric material otherwise used to fill the same volume or to provide the same thickness of protective layer. Additionally, the cost of buying a resin preformed into a fiber or tape is avoided because the resin can be purchased in raw material pellet form at a lower material cost.

Figure 4:
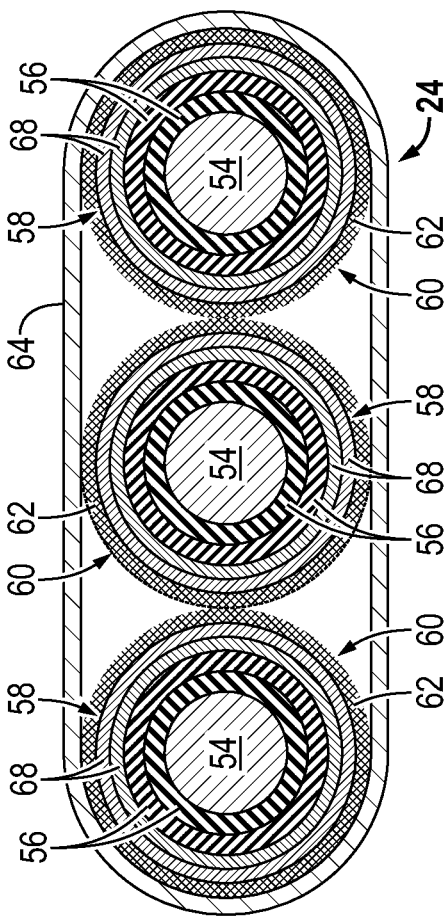
FIG. 4 is a cross-sectional view of another example of a power cable having a foamed protective layer, according to an embodiment of the disclosure.

Referring generally to FIG. 4, another embodiment of power cable 24 is illustrated in cross-section. In this example, three copper conductors 54 are each separately covered by insulation layer 56 formed of EPDM insulation. However, the insulation layer 56 may comprise a plurality of layers as illustrated. The insulation layer(s) 56, e.g. EPDM insulation layer, is covered by fluid barrier layer 58 in the form a lead barrier layer 68. The fluid barrier 58 also may comprise a plurality of layers as illustrated. In this embodiment, the protective layer 60 is in the form of an extruded foamed protective layer positioned directly over the lead barrier layer 68. Each conductor 54 and the corresponding EPDM insulation layer 56, lead protective layer 58, and foamed protective layer 60 are positioned sequentially adjacent, e.g. side-by-side, and subjected to an armoring process (e.g. by winding a metal armor strip in an overlapping helical fashion) to form a flat cable 24.

Depending on the application, the power cable 24 may have a variety of shapes and/or components. For example, the power cable 24 may have a variety of layers formed of various materials in various orders within the armor layer. Additionally, various layers may be disposed around the corresponding conductors individually or collectively. The foamed protective layer 60 also may be formed from a variety of different materials which are foamed to create internal closed gas pockets of desired size and arrangement. The number, type, and arrangement of electrical conductors also may be selected according to the parameters of a given application and environment. For example, the electrical cable may have a round configuration, a rectangular configuration, or a flat configuration to accommodate certain spatial constraints. Various additives and materials may be mixed with or otherwise added to materials forming the various layers of the power cable 24. The power cable 24 may be used to provide electrical power to downhole systems, e.g. electric submersible pumping system 22, however the power cable 24 may be used in a variety of other types of applications.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for conducting electricity, comprising:
   a cable having:
      a plurality of conductors for conducting electricity;
      a plurality of insulation layers, each insulation layer of the plurality of insulation layers in contact with a respective conductor of the plurality of conductors;
      a plurality of fluid barrier layers, each fluid barrier layer of the plurality of fluid barrier layers in contact with a respective insulation layer of the plurality of insulation layers;
      a plurality of protective layers, each protective layer in the form of a foamed protective layer and in contact with a respective fluid barrier layer of the plurality of fluid barrier layers; and
      an armor layer, the armor layer in contact with each of the plurality of protective layers.

2. The system as recited in claim 1, wherein each conductor comprises copper.

3. The system as recited in claim 1, wherein each insulation layer comprises EPDM.

4. The system as recited in claim 1, wherein each fluid barrier layer comprises lead.

5. The system as recited in claim 1, wherein each protective layer comprises a polymer.

6. The system as recited in claim 5, wherein each protective layer comprises foamed PET.

7. The system as recited in claim 1, wherein the protective layer is extruded onto each fluid barrier layer.

8. The system as recited in claim 1, wherein the armor layer comprises Monel™.

9. The system as recited in claim 1, wherein the armor layer comprises stainless steel.

10. The system as recited in claim 1, wherein the armor layer comprises galvanized steel.

11. A method for conducting electricity in a harsh environment, comprising:
   providing a conductor for conducting electricity;
   covering the conductor with an insulation layer;
   surrounding the insulation layer with a fluid barrier layer to prevent ingress of deleterious fluids to the conductor;
   placing a foamed protective layer along the fluid barrier layer by extruding a polymer along the fluid barrier layer and foaming the polymer using a blowing agent; and
   enclosing the foamed protective layer with an armor layer.

12. The method as recited in claim 11, wherein providing comprises providing three copper conductors.

13. The method as recited in claim 12, wherein covering comprises covering each copper conductor with the insulation layer formed of EPDM.

14. The method as recited in claim 13, wherein surrounding comprises surrounding each insulation layer with the fluid barrier layer formed of lead.

15. The method as recited in claim 11, wherein placing comprises extruding PET and foaming the PET.

16. The method as recited in claim 11, further comprising providing the polymer with at least 2% of the blowing agent to form the foamed protective layer.

17. The method as recited in claim 11, further comprising providing the polymer with at least 5% of the blowing agent to form the foamed protective layer.

18. A system, comprising:
an electric submersible pumping system deployed in a wellbore, the electric submersible pumping system comprising a submersible pump powered by a submersible electric motor; and
a power cable routed downhole along the wellbore and electrically coupled with the submersible electric motor, the power cable comprising:
three conductors for providing three-phase electrical power to the electric submersible pumping system;
a plurality of insulation layers with each insulation layer being disposed around a corresponding conductor of the three conductors;
a fluid barrier layer in contact with each insulation layer;
a foamed protective layer in contact with the fluid barrier layer, the foamed protective layer comprising a plurality of enclosed gas pockets to provide cushioning; and
an armor layer surrounding the foamed protective layer.

19. The system as recited in claim 18, wherein the foamed protective layer comprises three individual foamed protective layers and the armor layer is in contact with each of the three individual foamed protective layers.

20. The system as recited in claim 18, wherein each foamed protective layer is extruded onto a corresponding fluid barrier layer.

* * * * *